A. H. & D. A. WOLFE.
CASING FOR BRUSHES AND ANALOGOUS TOILET ARTICLES.
APPLICATION FILED FEB. 4, 1915.
1,166,296.
Patented Dec. 28, 1915.
3 SHEETS—SHEET 3.
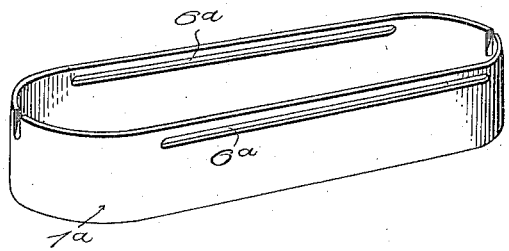
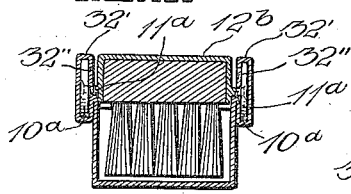
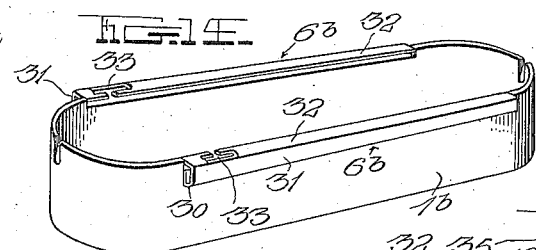
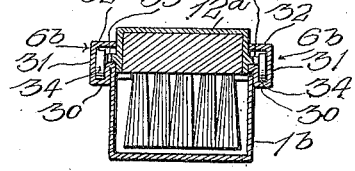
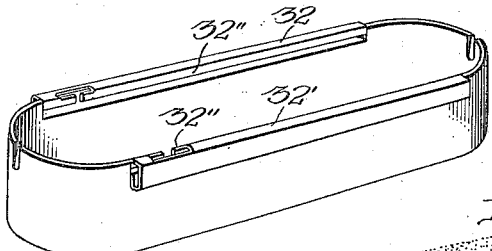
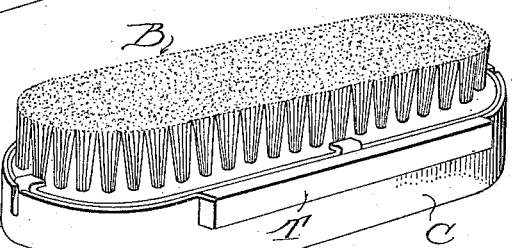
Witnesses
H. Woodard
Inventors
Arthur H. Wolfe
and Durward A. Wolfe
By
Attorneys

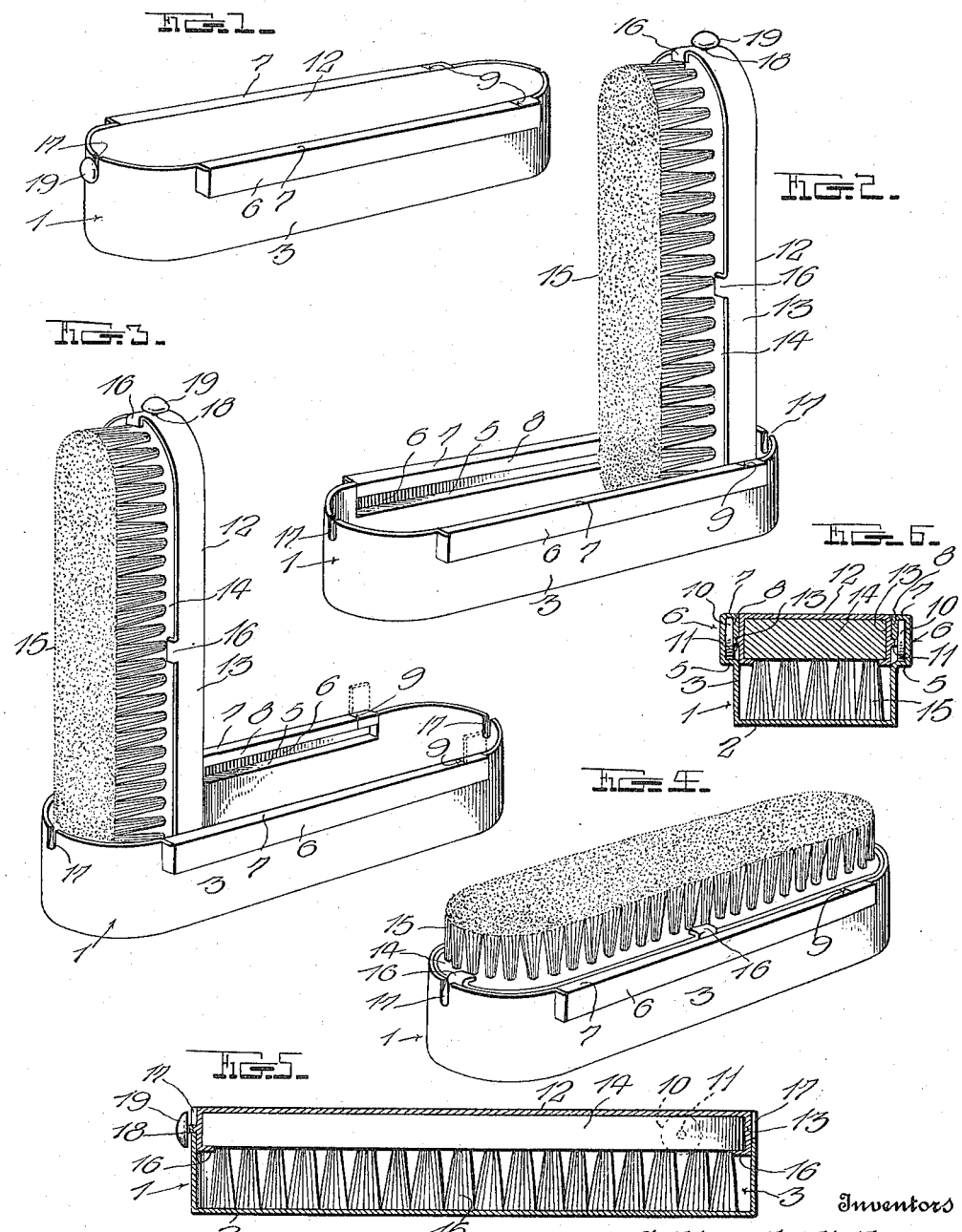

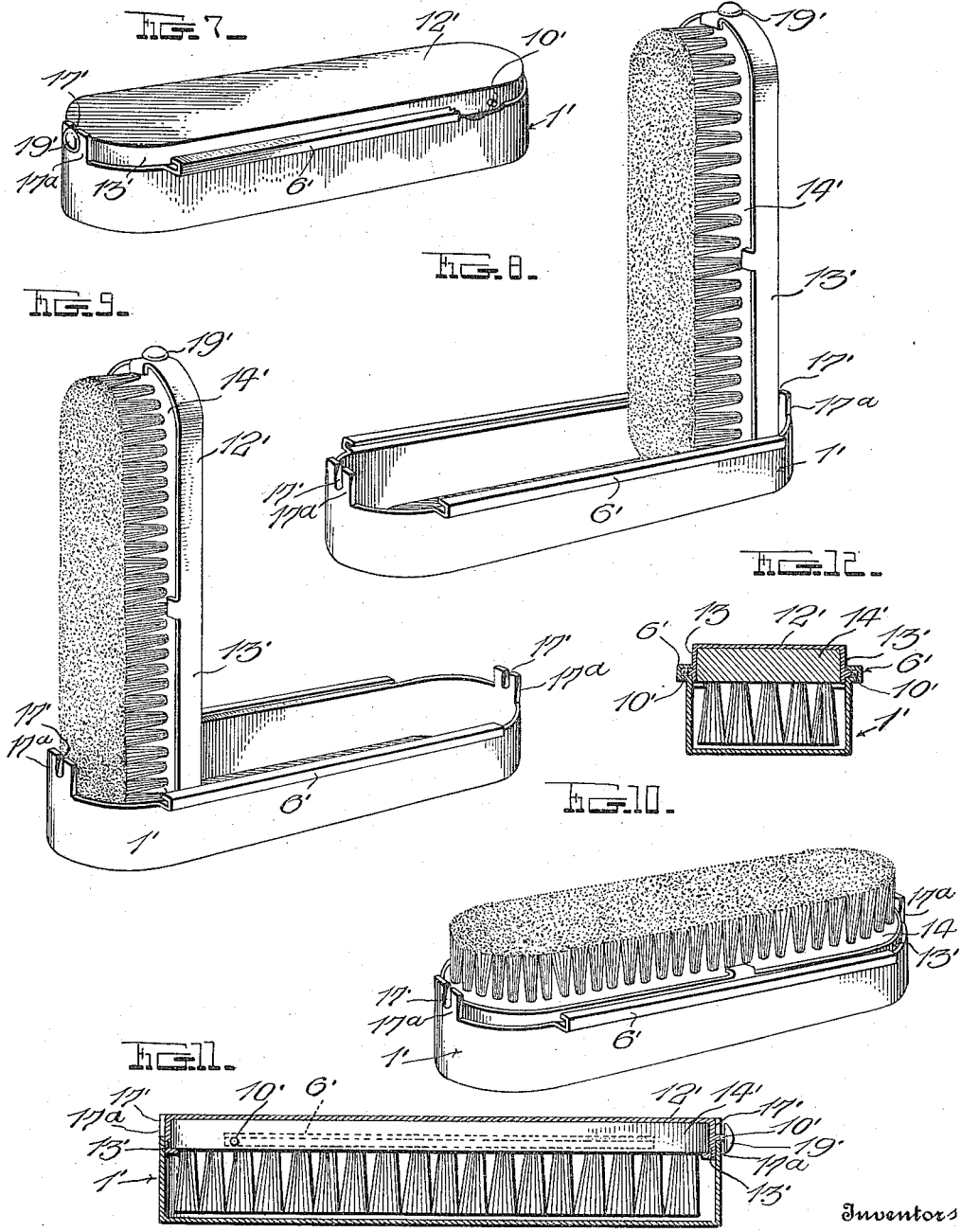

UNITED STATES PATENT OFFICE.

ARTHUR H. WOLFE, OF SCRANTON, PENNSYLVANIA, AND DURWARD A. WOLFE, OF WALTHAM, MASSACHUSETTS.

CASING FOR BRUSHES AND ANALOGOUS TOILET ARTICLES.

1,166,296.  Specification of Letters Patent.  Patented Dec. 28, 1915.

Application filed February 4, 1915.  Serial No. 6,130.

*To all whom it may concern:*

Be it known that we, ARTHUR H. WOLFE, a citizen of the United States, residing at Scranton, in the county of Lackawanna, State of Pennsylvania, and DURWARD A. WOLFE, a citizen of the United States, residing at Waltham, in the county of Middlesex and State of Massachusetts, have invented certain new and useful Improvements in Casings for Brushes and Analogous Toilet Articles; and we do declare the following to be a full, clear, and exact description of the invention, such as will enable others skilled in the art to which it appertains to make and use the same.

Our invention relates broadly to improvements in toilet articles, and more particularly to casings or housings for confining toilet brushes or other articles.

The object of the invention is to provide a device of this character which may be simply and inexpensively constructed and marketed, which will be very efficient in operation, and which, both when in use and when not in use, will present a neat and attractive appearance.

In carrying out the above object, we employ certain novel features of construction and combination hereinafter more fully described and claimed and shown in the drawings wherein:—

Figure 1 is a perspective view of one form of the casing showing the same closed; Fig. 2 is a similar view showing the first step in opening the casing; Fig. 3 is another perspective view showing the second step; Fig. 4 is a similar view showing the brush exposed for use; Fig. 5 is a central vertical longitudinal section; Fig. 6 is a vertical transverse section; Fig. 7 is a perspective view showing a slightly modified form of construction and illustrating the casing in closed position; Figs. 8 and 9 are similar views showing the necessary steps in opening the casing; Fig. 10 is yet another perspective view showing the brush exposed for use; Fig. 11 is a longitudinal section of this form of the invention; Fig. 12 is a vertical transverse section thereof; Fig. 13 is a detail perspective view of one section of the casing showing another modified form of construction; Fig. 14 is an additional perspective view showing still another manner of constructing the device; Fig. 15 is a transverse section of the casing section seen in Fig. 14 and illustrating the cover section applied thereto; Fig. 16 is a perspective view of one of the shoes employed in connection with this form of the device; Fig. 17 is a detail perspective view showing a form of construction differing slightly from that seen in Fig. 14; Fig. 18 is a transverse section through the device as seen in Fig. 17 and showing the cover section applied thereto; and Fig. 19 is a perspective view of a hair brush showing the manner in which the invention may be applied thereto, in which case the head of the brush is formed by the casing.

In describing the invention, we will refer first to Figs. 1 to 6 inclusive, these figures showing the device constructed in one of the numerous fashions in which it can be manufactured. In these figures, the numeral 1 designates an elongated casing section which is provided with a solid bottom 2, and with a continuous side wall 3, the upper side or end of the section 1 being open. In manufacturing the section 1, the longitudinal sides thereof are preferably formed of greater height than the end walls thereof and this additional width of metal is first deflected outwardly as most clearly seen at 5 in Fig. 6, is then continued upwardly at 6, is bent inwardly as shown at 7, and then continued downwardly to provide retaining flanges 8. By this construction, substantially channel-shaped tracks are provided on the two sides of the section 1, these tracks being located contiguous to the upper edges of the side walls thereof. Near one end, the inwardly bent portion 7 and the depending retaining flanges 8 are slit transversely as indicated at 9 (see more particularly Fig. 3) this provision being made in order to allow one end of these members to be bent upwardly as indicated in dotted lines in this figure. By so doing, a pair of heads 10 with which studs 11 are equipped, may be inserted downwardly into the tracks, after which the terminals of the latter are again bent to their normal positions. As shown in Figs. 5 and 6, the headed studs 11 project laterally from opposite sides of a cover member 12, this member being in the form of a flat plate having a depending flange 13, and it is from this flange that said studs project. The flange 13 acts not only as means for mounting the studs 11, but retains the back 14 of a brush, the bristles 15 thereof depending from said back into the casing section, under normal conditions. The back 14 of the brush is retained within the flange 13 by providing the latter with a plurality of inwardly extending lips 16 which are crimped inwardly around the under side of said back as clearly disclosed in the various figures of the drawings.

In addition to the various details of construction above set forth, the upper edges of the wall 3, at the opposite ends of the section 1, are provided with notches 17 which are adapted to receive the shank 18 of an additional headed stud, the head 19 of this stud acting as means for forcing the cover member 12 and the brush carried thereby upwardly out of the section 1 as will be readily understood by an inspection of the drawings.

Under normal conditions, the cover member 12 and the brush 14 are housed within the section 1 as shown in Figs. 1 and 6, but when it is desired to expose the brush for use, the head 19 is forced upwardly, thus raising the entire cover member and brush to the position seen in Fig. 2, whereupon said member may be forced to the other end of the section 1 or in other words, to the position seen in Fig. 3, during which movement, the roller heads 10 travel within the tracks above described. It is then only necessary to swing the upper end of the cover member downwardly to position the shank 18 in the notch 17 opposite the one engaged when the cover member is closed. It will therefore be seen that the brush is disposed in such a position as to render it readily applicable to the various uses for which it may be employed, and that the rollers or heads 10 prevent one end of the brush from moving into the section 1 while the shank 18 prevents the other end thereof from having such movement. When it is desired to again house the brush within the casing, it is of course necessary to reverse the operation just described.

In Figs. 7 to 12 inclusive, similar construction is shown in which the cover member 12′ is identical with that previously described and retains the brush head 14′ in the same manner. The main differences however, are in the construction of the tracks 6′ on the longitudinal side walls of the section 1′ and in the disposition of the slots or notches 17′ which receive the shank of the headed stud 19′. In this form of the invention, said tracks are shown of substantially C-shape in cross section and as receiving cylindrical studs or pins 10′ which project laterally from the flanges 13′ of the cover member 12′, no heads being provided on these studs in this form of the device. Furthermore, the style now being described, differs from that previously set forth, by the fact that the slots 17′ are formed in ears 17ª which rise from the opposite ends of the section 1′. Otherwise, the construction is identical with that shown on the first sheet of drawings.

In Fig. 13, the lower casing section 1ª is shown as provided with slots 6ª near its upper edges, these slots constituting tracks in which pins similar to the pins 10′ are adapted to travel, when the cover member and brush are applied, these features being eliminated in this figure however, for the sake of clearness.

Figs. 14 and 15 disclose a still further modification of the device, in this case the tracks 6ᵇ being formed by constructing the side walls of the casing section 1ᵇ of greater height than the end walls thereof, by bending the same downwardly upon themselves, thence outwardly at 30, upwardly at 31, and inwardly to provide retaining flanges 32, the latter being provided, at one end, with T-slots 33 which are adapted to allow the insertion of substantially ovate shoes 34 (see Fig. 16), these shoes being carried by studs 35 which project laterally from the depending flange of the cover member 12ª.

Figs. 17 and 18 disclose construction which is identical with that shown in Figs. 14 and 15, with the exception that the retaining flanges 32′ are continued downwardly as seen at 32″, the tracks in this case, housing rollers 10ª which are carried by studs 11ª projecting laterally from a depending flange of the cover member 12ᵇ.

In the foregoing description, we have described a number of ways in which the various parts of the device may be manufactured, but it will be readily understood that we need not be limited to any of these details, otherwise than as set forth in the appended claims. It will be further understood that the devices may be constructed in any desired proportions, and of any appropriate materials. In fact, if desired, the articles may be constructed substantially as seen in Fig. 19, in which case, the casing section C is provided with appropriate forms of tracks T and with a handle H, the casing C being provided to normally retain a brush B which may be considered as mounted within said casing in any one of the ways above described.

By reference to the accompanying drawings, when taken in connection with the preceding description and explanation, it will be seen that very efficient and attractive articles have been provided for carrying out the object of the invention, yet that such articles may be simply and inexpensively manufactured.

We claim:—

1. A casing of the class described comprising a casing section including a plate, and side and end walls extending therefrom, each end wall having in its free edge a notch, an additional and reversible casing section received by the other section and having a projection on one end for reception in either notch and to project beyond the notches for engagement by the thumb of the user, and a combined sliding and pivotal connection between the sides of the two casing sections.

2. A casing of the class described comprising a casing section including a plate, and side and end walls extending therefrom, each end wall having in its free edge a notch, an additional and reversible casing section received by the other section and having a stud projecting from one of its ends for reception in either notch, a head on the outer end of the stud for engagement by the thumb of the user, and a combined sliding and pivotal connection between the sides of the two casing sections.

3. A casing of the class described comprising a casing section including a plate, and side and end walls extending therefrom, the free edge of each side wall being bent outwardly, upwardly and then inwardly to form a pair of inwardly opening hollow tracks, and a second and reversible casing section received by the other section and having studs projecting laterally into the tracks.

4. A casing of the class described comprising a casing section including a plate, and side and end walls extending therefrom, a hollow inwardly opening track on the free edge of each side wall, and a second and reversible casing section received by the other section and having headed studs extending into said hollow tracks with their heads confined therein.

5. A casing of the class described comprising a casing section including a plate, and side and end walls extending therefrom, the free edge of each side wall being bent outwardly and downwardly, then outwardly and upwardly, and then inwardly, whereby to form a pair of hollow tracks, and an additional and reversible casing section received by the other section and having headed studs projecting into the tracks with their heads confined therein.

6. A casing of the class described comprising a casing section including a plate, and side and end walls extending therefrom. the free edge of each side wall being bent outwardly and downwardly, then outwardly and upwardly, and finally inwardly and downwardly, whereby to form a pair of hollow tracks, and an additional and reversible casing section received by the other section and having headed studs projecting into the tracks with their heads confined therein.

In testimony whereof we have hereunto set our hands in presence of the subscribing witnesses.

ARTHUR H. WOLFE.
DURWARD A. WOLFE.

Witnesses for A. H. Wolfe:
  EUGENE T. SMITH,
  HAROLD P. WOLFE.
Witnesses for Durward A. Wolfe:
  FRED M. KILROW,
  HAROLD RALPHS.

Copies of this patent may be obtained for five cents each, by addressing the "Commissioner of Patents, Washington, D. C."